United States Patent
Guo et al.

(10) Patent No.: US 9,286,134 B2
(45) Date of Patent: Mar. 15, 2016

(54) VIRTUAL MACHINE PLACEMENT IN A CLOUD-BASED NETWORK

(71) Applicant: Alcatel-Lucent USA Inc., Murray Hill, NJ (US)

(72) Inventors: Yang Guo, Princeton Junction, NJ (US); Aleksandr Stolyar, Basking Ridge, NJ (US); Anwar Walid, Watchung, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 481 days.

(21) Appl. No.: 13/731,408

(22) Filed: Dec. 31, 2012

(65) Prior Publication Data
US 2014/0189707 A1    Jul. 3, 2014

(51) Int. Cl.
G06F 9/50    (2006.01)

(52) U.S. Cl.
CPC ................................ G06F 9/5083 (2013.01)

(58) Field of Classification Search
None
See application file for complete search history.

(56) References Cited

U.S. PATENT DOCUMENTS

| | | | |
|---|---|---|---|
| 8,667,490 B1* | 3/2014 | van der Goot | 718/1 |
| 2011/0107332 A1* | 5/2011 | Bash | 718/1 |
| 2012/0042061 A1* | 2/2012 | Ayala et al. | 709/224 |
| 2012/0239376 A1* | 9/2012 | Kraft et al. | 703/22 |
| 2013/0067469 A1* | 3/2013 | Das et al. | 718/1 |
| 2013/0073730 A1* | 3/2013 | Hansson et al. | 709/226 |
| 2013/0297964 A1* | 11/2013 | Hegdal et al. | 714/2 |
| 2014/0149493 A1* | 5/2014 | Acer et al. | 709/203 |

* cited by examiner

*Primary Examiner* — Umut Onat
(74) *Attorney, Agent, or Firm* — Chiesa Shahinian & Giantomasi PC

(57) ABSTRACT

Methods and apparatuses for real-time adaptive placement of a virtual machine are provided. In an embodiment, a virtual machine is received at a routing component, the routing component having a processor in communication with a memory. By the processor in communication with the memory, a target data center is determined from a plurality of data centers based on a data center index, and the virtual machine is routed to the target data center. A physical machine is chosen within the target data center for placing the virtual machine.

18 Claims, 3 Drawing Sheets

VIRTUAL MACHINE PLACEMENT IN A CLOUD-BASED NETWORK

TECHNICAL FIELD

The present disclosure is generally directed to cloud-computing, and more specifically to routing virtual machines to data centers, as well as placement of virtual machines into physical machines in a data center, within a cloud-based network.

BACKGROUND

One of the challenges for network service providers is effective resource management. The resources of any computing environment (e.g., processing power, memory, data storage) are finite and constrained. While certain resources may be generally available, other resources may only be available to certain components of a network. For example, in a cloud-computing environment processors and memory are typically confined to individual physical machines and can be shared only locally; while data storage is often provided as a pooled service where multiple physical machines can access and share the storage capacity. As such, an on-going challenge for network service providers is to determine how to efficiently allocate and utilize resources in an inherently dynamic, complex, and heterogeneous cloud-computing environment.

A virtual machine is an instance of an operating system along with one or more applications running in an isolated partition within a computer. For the purposes of the description herein, a virtual machine can be viewed as a processing job requiring certain amounts of computing resources of different types. Virtual machines may be employed in a cloud-computing environment to enable resource sharing and reconfigurations of cloud-computing systems and networks. Virtual machines can share processor and memory resources by residing on a common physical machine, and can be resized (e.g., change the amounts of resources that they require) and migrated (e.g., to other physical machines) based on load-balancing and/or other requirements. As such, the flexibility of virtual machines can allow communication service providers to offer customers processing and storage services in a pay-as-you-go manner while allocating resources more efficiently. Moreover, methods to optimize the deployment of virtual machines in a cloud-computing environment may contribute further to meeting network service provider load-balancing and/or other requirements.

SUMMARY

Methods and apparatuses for real-time adaptive placement of virtual machines within a cloud-based network are provided. In accordance with an embodiment, a method for real-time adaptive placement of a virtual machine comprises receiving a virtual machine request at a routing component. The virtual machine request is routed to a target data center determined from a plurality of data centers based on a data center index calculation, wherein the data center calculation is based on a current state of virtual queues associated with the plurality of data centers. In response to routing the virtual machine to the target data center, virtual queues and configuration usage fractions associated with the plurality of data centers may be updated.

In accordance with an embodiment, each of the plurality of data centers may include one or more physical machines to host one or more virtual machines. A designated configuration for physical machines may be determined based on information from the virtual machine and a configuration index, and the virtual machine may be routed within the target data center to a physical machine associated with the designated configuration.

In accordance with an embodiment, a maximum average fraction of physical machines in use may be minimized for the plurality of data centers.

In accordance with an embodiment, a maximum average utilization may be minimized for the plurality of data centers, wherein utilization of a data center is the maximum of an average fraction of physical machines in use and an average utilization of one or more resource pools shared across the data center.

These and other advantages of the invention will be apparent to those of ordinary skill in the art by reference to the following detailed description and the accompanying drawings.

DETAILED DESCRIPTION

Real-time adaptive placement of virtual machines can minimize maximum resource utilization across a plurality of data centers, such as in a cloud-based network. Real-time adaptive placement (also referred to herein as virtual machine placement) is a combined virtual machine to data center routing and virtual machine to physical machine assignment technique, and can dynamically account for constraints on the allocation of virtual machines to host physical machines within a data center.

Real-time adaptive placement of virtual machines allows for virtual machine routing decisions to dynamically adjust based on changes in virtual machine demand rates, changes in system parameters and other factors. In one embodiment, virtual machine placement includes routing a virtual machine to one of a plurality of data centers. A data center can include one or more physical machines that potentially can host multiple virtual machines simultaneously up to a limit determined by physical machine resources. For example, the total resource requirements of all virtual machines assigned to a physical machine cannot exceed the resource amounts at the physical machine.

Figure 1:
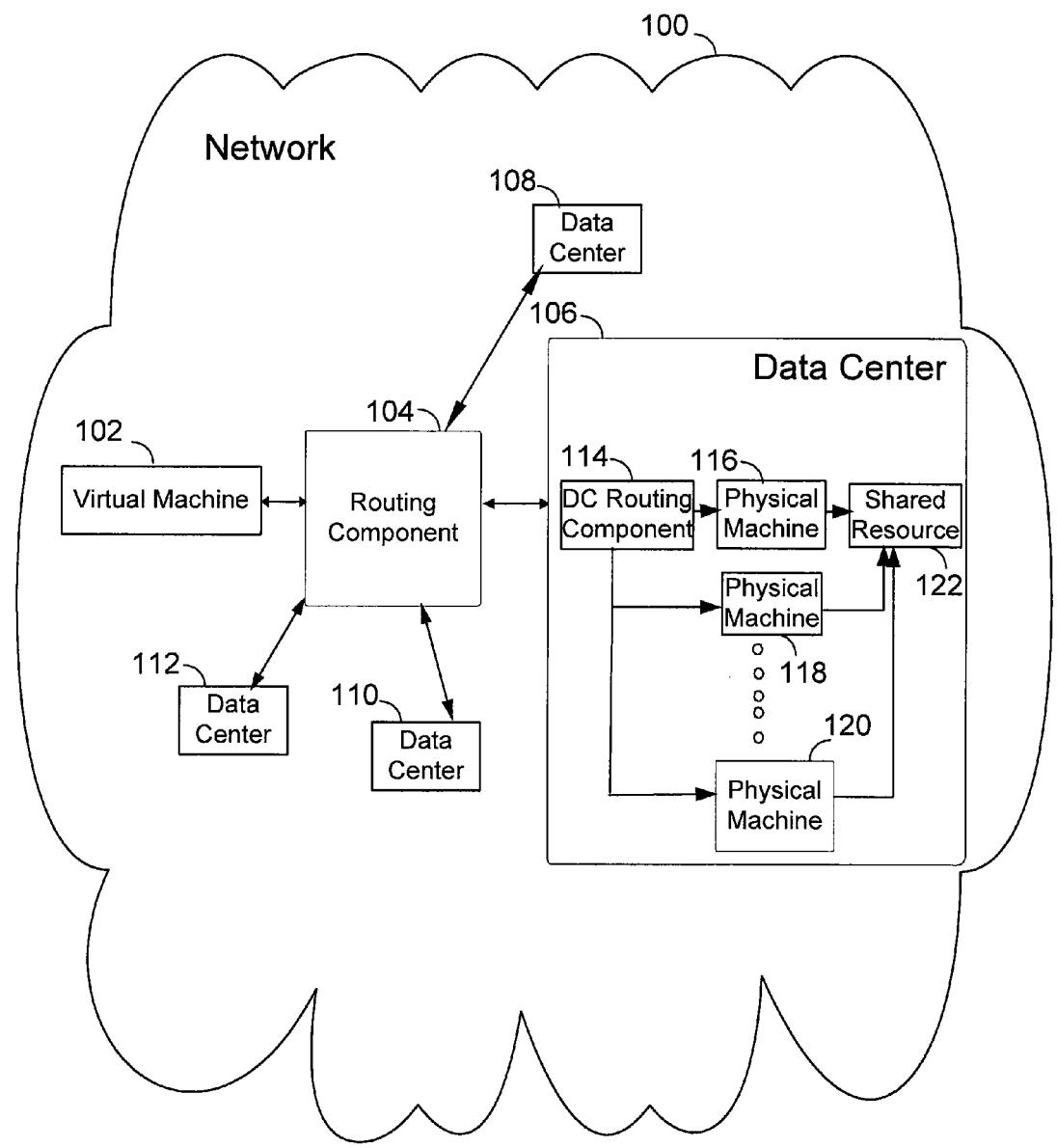
FIG. 1 illustrates a functional diagram for real-time adaptive placement of a virtual machine in accordance with an embodiment.

FIG. 1 illustrates a functional diagram for real-time adaptive placement of a virtual machine in accordance with an embodiment. For example, network 100 receives a plurality of virtual machines (i.e., processing jobs requiring a discrete amount of computing resources), such as virtual machine 102, at routing component 104. Network 100 further includes a plurality of data centers, such as data centers 106, 108, 110 and 112. In one embodiment, data centers 106, 108, 110 and 112 each include a plurality of physical machines to host one or more virtual machines. Various types of virtual machines and physical machines are possible. In general, a virtual machine can be characterized by required amounts of resources, and a physical machine can be characterized by the resource amounts it possesses.

Data center 106 includes data center routing component 114 to receive virtual machines and to route virtual machines to physical machines 116, 118 and 120. Physical machines 116, 118 and 120 may then host (i.e., provide resources to) virtual machines, such as virtual machine 102.

Particular data centers may include particular types of physical machines, e.g., physical machines that include one or more particular resources. For example, a physical machine resource may be associated with one of processing, memory and disk storage space. Moreover, a resource may be associated with one of an individual physical machine and a data center shared resource pool. For example, a particular resource, such as disk storage, may exist as a pooled resource generally associated with a data center and accessible by one or more physical machines within the data center, such as shared resource 122.

In cloud-based network 100, virtual machine 102 is received by routing component 104. In one embodiment, virtual machine placement generally includes two determinations: (i) a network routing determination to direct a virtual machine received at a network component to a particular target data center; and (ii) a data center routing determination to assign the received virtual machine to a particular physical machine within the target data center. In the first determination, a target data center (e.g., data center 106) is determined from a plurality of data centers based on a data center index calculation, as described in detail below. In the second determination, a designated configuration for physical machines is determined, e.g., by data center routing component 114, based on information from the received virtual machine and a configuration index calculation, also described in detail below. The virtual machine is then routed (e.g., by data center routing component 114) within the target data center to a physical machine associated with the designated configuration, such as one of physical machine 116, 118 and 120.

After the virtual machine is assigned to a particular physical machine, the virtual machine is processed utilizing the resources of the physical machine and, if necessary, shared resources (e.g., shared resource 122). The virtual machine leaves the physical machine after service is completed and releases the allocated resources, allowing the physical machine to process other virtual machines. In particular, there may be several classes of virtual machines (i.e., processing jobs), indexed by $i \in I = \{1, \ldots, I\}$. Class i virtual machines may arrive at a rate $\lambda_i$. Each class i virtual machine requires computing resources of different types when it is served, e.g., an amount $a_{ik} > 0$ of resources $k=1, \ldots, K$. When virtual machine i is placed for service (i.e., allocated a required amount of resources), its average service (i.e., mean processing) time is $1/\mu_i$. After the service is completed, resources allocated to the virtual machine are released and the virtual machine leaves the physical machine.

Cloud-based network 100 includes a plurality of data centers (i.e., data centers 106, 108, 110 and 112), which can be represented mathematically by j (e.g., DC j). As described above, data center resources (also referred to herein as resources) $k=1, \ldots, K$, may include pooled (i.e., shared) resources $k \in K_p = \{1, \ldots, K'\}$, and resources localized to particular physical machines, $k \in K_l = \{K'+1, \ldots, K\}$, within a data center. For example, DC j may include a total amount $\beta_{jk} > 0$ of a pooled resource $k \in K_p$, and $\beta^*_j$ physical machines, each of which has an amount $A_{jk} > 0$ of a localized resource $k \in K_l$.

A class i virtual machine routed to DC j can be further routed to one of the physical machines within DC j where $a_{ik}$ localized resources are allocated (if they are still available at that particular physical machine), and $a_{ik}$ pooled resources are allocated (if they are still available at DC j). Therefore, a physical machine in DC j can simultaneously serve a number of different virtual machines given by a configuration vector $s=(s_i, i=1, \ldots, I)$ if $\Sigma_i s_i a_{ik} \leq A_{jk}$, for all $k \in K_l$. Such configuration vectors thereafter will be referred to feasible configurations for DC j. A feasible configuration s is called maximal, if there is no other feasible configuration s' such that $s_i \leq s_i'$ for all VM types i and $s_i < s_i'$ for at least one i. The set of all maximal feasible configurations for DC j will be denoted by $S_j$. A subset $\hat{S}_j$ of $S_j$ is called a reduced set of maximal feasible configurations, if for any $s \in S_j$ there are $s^1, s^2, \ldots, s^n \in \hat{S}_j$ and a set of non-negative numbers $w^1, w^2, \ldots, w^n$ such that $w^1 + w^2 + \ldots + w^n = 1$ and $s \leq s^1 w^1 + s^2 w^2 + \ldots + s^n w^n$, In one embodiment, a virtual machine may require resources including disk storage, processing power (i.e., CPU) and memory, which can be indexed by $k=1, 2$ and 3, respectively. For example, disk storage may be a pooled resource, while processing and memory resources may be localized resources (i.e., $K=3$, $K'=1$, $K_p=\{1\}$, $K_l=\{2,3\}$). As such, for DC j, physical machine utilization may be the fraction or percentage of physical machines that are non-idle within DC j, and resource utilization for each pooled resource k may be the fraction or percentage of the resource that is in use within DC j.

Therefore, by determining physical machine and resource utilization variables, virtual machine placement can be implemented with an objective of load balancing of various utilizations at a plurality of data centers within a cloud-based network. For example, a maximum of all average physical machine utilizations and all average resource utilizations across a plurality of data centers can be minimized.

In one embodiment, virtual queues may be maintained and updated, and virtual machine placement may be based on a status of virtual queues. For example, DC j may have associated virtual queues, $(j, k)$, $k \in K_p$, and $(j, i)$, $i \in I$; where queue length is denoted by $Q_{jk}$ and respectively. When a virtual machine is received, a virtual machine class (i.e., type) is determined (e.g., a class i virtual machine), and the virtual machine is routed to a particular data center, e.g., DC m. As such, an amount of virtual work $a_{ik}/(\beta_{mk}\mu_i)$ is placed into virtual queue $(m, k)$, such that $Q_{mk}:=Q_{mk}+a_{ik}/(\beta_{mk}\mu_i)$, and an amount of virtual work $1/(\beta^*_m\mu_i)$ is placed into virtual queue $(m, i)$.

In determining a target data center for a received virtual machine, $R_i$ may denote a subset of data centers where at least one class i virtual machine can fit into a physical machine, i.e. $a_{ik} \leq A_{jk}$ for all $k \square K_l$. In one embodiment, for each received virtual machine (e.g., a class i virtual machine), a target data center DC m is determined by a data center index, $$m \in \arg\min_{j \in R_i} \left[ Q_{ji}/(\beta^*_j \mu_i) + \sum_{k \in K_p} Q_{jk} a_{ik}/(\beta_{jk}\mu_i) \right].$$

The virtual machine is then routed (e.g., by a routing component) to DC m, and queues for DC m are updated such that $Q_{mk}:=Q_{mk}+a_{ik}/(\beta_{mk}\mu_i)$, for all $k \in K_p$, and $Q_{mi}:=Q_{mi}+1/(\beta^*_m\mu_i)$.

Next, for each DC j, a configuration $$\sigma^j \in \arg\max_{s \in \hat{S}_j} \sum_{i' \in I} s'_i Q'_{ji}$$

is determined, wherein $\hat{S}_j$ is a reduced set of feasible configurations for DC j defined earlier. If condition, $$\eta \sum \left[ \sum_{k \in Kp} Q_{jk} + \sum_{i' \in I} \sigma^j_{i'} Q'_{ji} \right] \geq 1$$

holds, then queues, $Q_{jk}$ and $Q_{ji}'$ are updated such that $Q_{jk}:=\max\{Q_{jk}-c, 0\}$, for all j and $k \in K_p$, and $Q_{ji}':=\max\{Q_{ji}'-c\sigma^j_{i'}, 0\}$, for all j and $i \in I$. Parameter c is such that $c > \max_{ij} \max_{k \in Kp} a_{ik}/(\beta_{jk}\mu_i)$ and $c > \max_{ij} 1/(\beta^*_{j k} \mu_i)$. Here the parameter η is some sufficiently small positive number, related to other parameters. In one embodiment, the value of η can be chosen as $\eta = g/(cJ(K'+I))$, where g can be chosen as 2, 5, 10.

Moreover, for each DC j, configuration usage fractions, $\hat{\phi}_{sj}$, are updated such that $\hat{\phi}_{sj}:=\theta I(s, \sigma^j)+(1-\theta) \hat{\phi}_{sj}$, for all j and $s \in \hat{S}_j$, where $I(s, \sigma^j)=1$ if s was the configuration $\sigma^j$ determined above and condition η

$$\sum \left[ \sum_{k \in Kp} Q_{jk} + \sum_{i' \in I} \sigma^j_{i'} Q'_{ji} \right] \geq 1$$

holds, and $I(s, \sigma^j)=0$ otherwise. In one embodiment, the configuration usage fractions $\hat{\phi}_{ij}$ may be utilized to assign a virtual machine to a physical machine within a target data center. Here parameter θ is some sufficiently small positive number. In one embodiment it can be θ=0.01.

In one embodiment, a virtual machine routed to a target data center DC j assigned to a physical machine within the target data center. Each non-empty physical machine within DC j at any given time has a designated configuration $s \in \hat{S}_j$ wherein a designation $s=(s_1, \ldots, s_I)$ means that no more than $s_i$ class i virtual machines may be placed into the physical machine. A physical machine with a designation s can be referred to as an s-physical machine (s-PM). Empty physical machines do not have a designation. A physical machine designation, once assigned, is maintained until the physical machine is empty (i.e., does not currently host any virtual machines). The total quantity $z_{ji}(s)$ of class i virtual machines in s-PMs (within DC j) is maintained for each $s \in \hat{S}_j$. In addition, the quantities $\hat{\phi}_{sj}$ (only for the DC j), need to be known.

When DC j receives a class i virtual machine, configuration index s'∈ arg min $\{s \in \hat{S}_j : s_i > 0\}$ $z_{ji}(s)/[s_i \hat{\phi}_{sj}]$ is determined, and the virtual machine is placed into an s'-PM. For example, among s'-PMs a physical machine with the maximal number of existing virtual machines is selected, but only such that the existing number of class i virtual machines is less than $s_i$ (e.g., such that the new class i virtual machine can be accommodated). The class i virtual machine is then assigned to the selected physical machine. If no such s'-PM is available, the class i virtual machine is placed into an empty physical machine, which is then designated as an s'-PM.

In an alternative embodiment, information from a target data center routing determination may not be required for a physical machine assignment within the target data center. For example, each localized resource k at DC j may be assumed to be a pooled resource whose total amount $\beta_{jk}$ is equal to the total amount of the resource in all of the physical machines, e.g., $\beta_{jk}=\beta^*_j A_{jk}$. As such, K'=K, i.e. $K_p=\{1, \ldots, K\}$ containing all resource types, and $K_l$ is empty. A virtual machine then may be routed to a target data center by determining a data center index, $$m \in \arg\min_{j \in Ri} \sum_{k \in Kp} Q_{jk} a_{ik} / (\beta_{jk}\mu_i).$$

The virtual machine is then routed to DC m, and queues for DC m, $Q_{mk}:=Q_{mk}+a_{ik}/(\beta_{mk}\mu_i)$, for all $k \in K_p$, is updated. Next, if condition $$\eta \sum \left[ \sum_{k \in Kp} Q_{jk} + \sum_{i' \in I} \sigma^j_{i'} Q'_{ji} \right] \geq 1$$

holds, then queues, $Q_{jk}$ are updated such that $Q_{jk}:=\max\{Q_{jk}-c, 0\}$, for all j and $k \in K_p$.

Next, on each DC j, wherein $K_l$ is a set of localized resources and there is a (small) parameter η>0, parameter c>0, and (small) parameter θ>0, for each received class i virtual machine into DC j, a queue $Q_{ji}$ is updated such that $Q_{ji}:=Q_{ji}+1/(\beta_j\mu_i)$. A configuration, $$\sigma^j \in \operatorname*{argmax}_{s \in \hat{s}j} \sum_i s_i Q_{ji}$$

is then determined. If condition $\eta \Sigma_i \sigma^j_i Q_{ji} \geq 1$ is true, then $Q_{ji}$ and $\hat{\phi}_{sj}$ are updated such that $Q_{ji}:=\max\{Q_{ji}-c \sigma^j_i, 0\}$, for each i, and $\hat{\phi}_{sj}:=\theta I(s, \sigma^j)+(1-\theta) \hat{\phi}_{sj}$, for all $s \in \hat{S}_j$, where $I(s, \sigma^j)=1$ if s was the configuration determined by $\sigma^j$ and condition $\eta \Sigma_i \sigma^j_i Q_{ji} \geq 1$ is true, and $I(s, \phi^j)=0$ otherwise.

Configuration index s'

$$\in \operatorname*{argmin}_{s \in \hat{S}j : si > 0} z^j_i(s) / [s_i \ \hat{\phi}_{sj}]$$

is then determined. Among s'-PMs, a physical machine having a maximum number of existing virtual machines is selected, but such that the existing number of class i virtual machines is less than $s_i$ (e.g., such that the received class i virtual machine can be accommodated). The class i virtual machine is then assigned to the selected physical machine. If no such s'-PM is available, the class i virtual machine is routed to an empty physical machine, which is then designated as an s'-PM.

Figure 2:
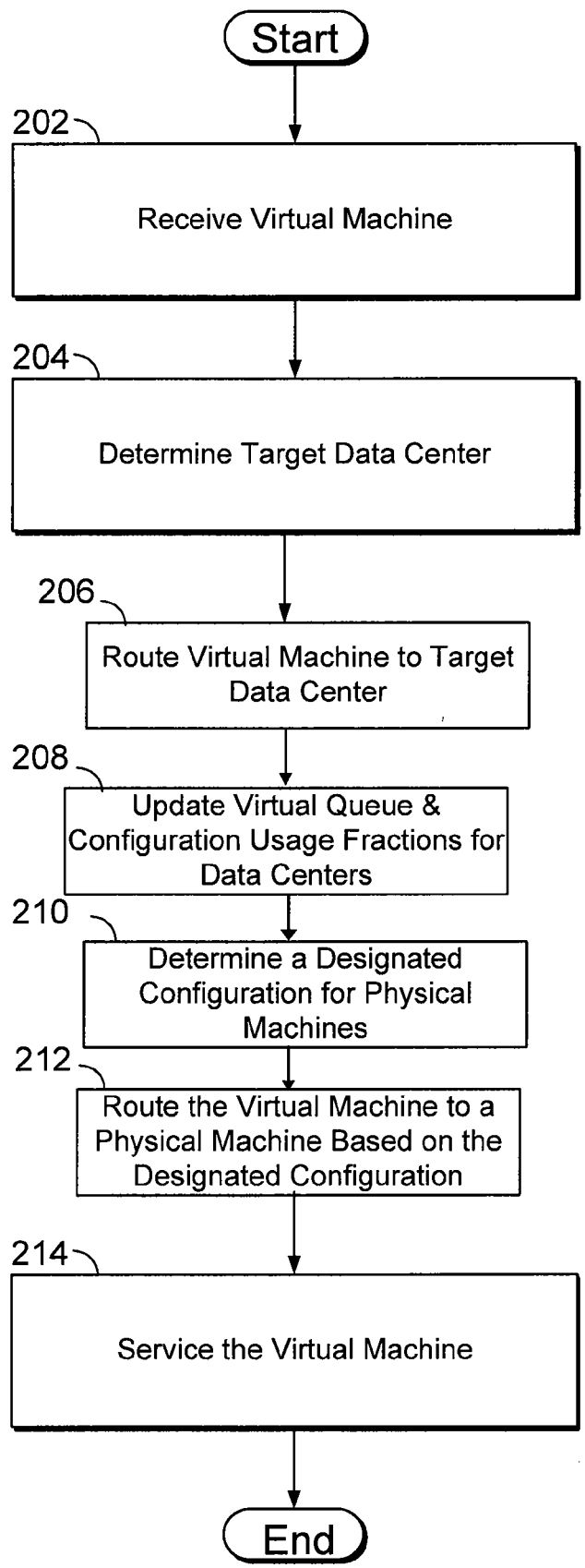
FIG. 2 illustrates a flowchart diagram for real-time adaptive placement of a virtual machine in accordance with an embodiment.

FIG. 2 illustrates a flowchart diagram for real-time adaptive placement of a virtual machine in accordance with an embodiment. Routing component 104 may perform virtual machine placement by receiving virtual machine 102 at 202. For example, routing component 104 may maintain virtual queues corresponding to one or more data centers and configuration usage fractions for one or more data centers, such as data centers 106, 108, 110 and 112 as described in connection with FIG. 1. Routing component 104 may then determine to route a virtual machine to a particular data center by performing a calculation based on a current state of the virtual queues.

At 204, a target data center is determined from the plurality of data centers based on a data center index calculation. For example, the data center index may be calculated as discussed above at routing component 104. The virtual machine is then routed to the target data center by routing component 104 at 206.

In response to routing the virtual machine to the target data center, a virtual queue, representing one or more virtual machines received at routing component 104, may be updated at 208. Configuration usage fractions associated with the data centers (e.g., data centers 106, 108, 110 and 112) also may be updated at 208.

At 210, a designated configuration for physical machines is determined, e.g., by data center routing component 114, based on information from the received virtual machine and a configuration index. For example, the target data center (e.g., data center 106) may include a plurality of physical machines to host one or more virtual machines. The configuration index may be calculated as discussed above externally at routing component 104 or, alternatively within a data center (e.g., data center 106) by data center routing component 114.

At 212, the virtual machine is routed (e.g., by data center routing component 114) within the target data center to a physical machine associated with the designated configuration, and the virtual machine is serviced at 214, i.e., allocated required localized resources at a physical machine and pooled resources shared within the data center.

In the various embodiments there is no need to know a priori, or explicitly measure, virtual machine receive rates, as the method can adapt automatically to changes in virtual machine receive rates. Virtual machine placement as described herein allows for the average maximum utilization to be minimized for the plurality of data centers, wherein data center utilization includes the maximum of the fraction of physical machines in use and the used fractions of all pooled resources.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 3:
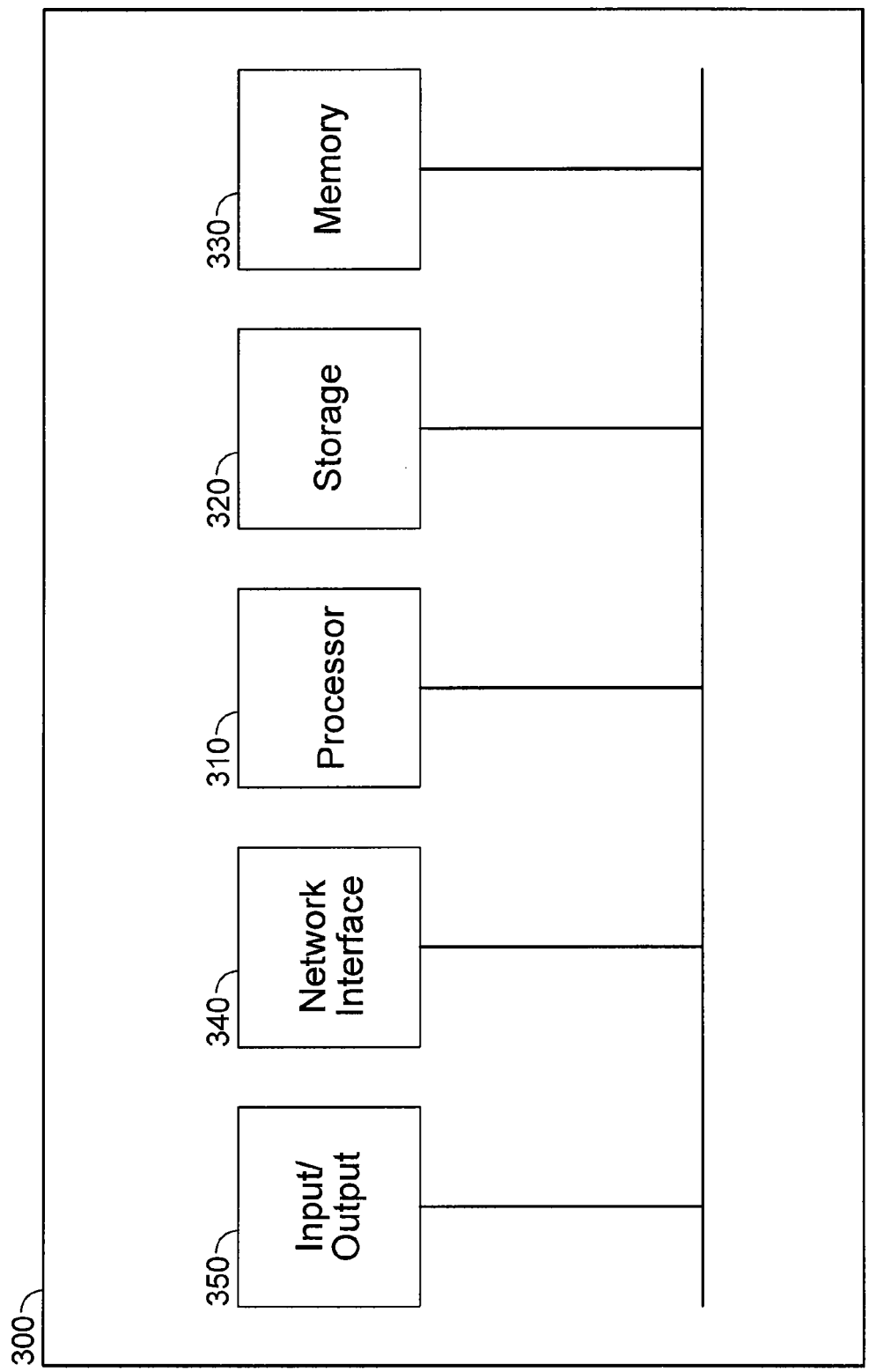
FIG. 3 is a high-level block diagram of an exemplary computer that may be used for real-time adaptive placement of a virtual machine.

A high-level block diagram of an exemplary computer that may be used to implement systems, apparatus and methods described herein is illustrated in FIG. 3. Computer 300 comprises a processor 310 operatively coupled to a data storage device 320 and a memory 330. Processor 310 controls the overall operation of computer 300 by executing computer program instructions that define such operations. The computer program instructions may be stored in data storage device 320, or other computer readable medium, and loaded into memory 330 when execution of the computer program instructions is desired. Referring to FIG. 1, for example, routing component 104 may comprise one or more components of computer 300. Thus, the method steps of FIG. 2 can be defined by the computer program instructions stored in memory 330 and/or data storage device 320 and controlled by processor 310 executing the computer program instructions. For example, the computer program instructions can be implemented as computer executable code programmed by one skilled in the art to perform an algorithm defined by the method steps of FIG. 2. Accordingly, by executing the computer program instructions, the processor 310 executes an algorithm defined by the method steps of FIG. 2. Computer 300 also includes one or more network interfaces 340 for communicating with other devices via a network. Computer 300 also includes one or more input/output devices 350 that enable user interaction with computer 300 (e.g., display, keyboard, mouse, speakers, buttons, etc.).

Processor 310 may include both general and special purpose microprocessors, and may be the sole processor or one of multiple processors of computer 300. Processor 310 may comprise one or more central processing units (CPUs), for example. Processor 310, data storage device 320, and/or memory 330 may include, be supplemented by, or incorporated in, one or more application-specific integrated circuits (ASICs) and/or one or more field programmable gate arrays (FPGAs).

Data storage device 320 and memory 330 each comprise a tangible non-transitory computer readable storage medium. Data storage device 320, and memory 330, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 350 may include peripherals, such as a printer, scanner, display screen, etc. For example, input/output devices 350 may include a display device such as a cathode ray tube (CRT), plasma or liquid crystal display (LCD) monitor for displaying information to the user, a keyboard, and a pointing device such as a mouse or a trackball by which the user can provide input to computer 300.

Any or all of the systems and apparatus discussed herein, including routing component 104, data center routing component 114, and physical machines 116, 118 and 120 may be implemented using a computer such as computer 300.

One skilled in the art will recognize that an implementation of an actual computer or computer system may have other structures and may contain other components as well, and that FIG. 3 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. An apparatus for real-time adaptive placement of a virtual machine, the apparatus comprising:
a memory to store computer program instructions; and
a processor communicatively coupled to the memory, the processor configured to execute the computer program instructions, which, when executed on the processor, cause the processor to perform operations comprising:
receiving a virtual machine;
determining a data center index for the received virtual machine based on lengths of virtual queues associated with respective data centers of a plurality of data centers, wherein the length of a virtual queue associated with a respective data center is based on a class of virtual machines that have been routed to the respective data center;
determining a target data center from the plurality of data centers based on the data center index; and
routing the virtual machine to the target data center.

2. The apparatus of claim 1, further comprising maintaining the virtual queues of one or more virtual machines received at a routing component.

3. The apparatus of claim 2, further comprising:
updating the virtual queues in response to routing the virtual machine to the target data center; and
updating configuration usage fractions associated with the plurality of data centers.

4. The apparatus of claim 1, wherein each of the plurality of data centers include one or more physical machines to host one or more virtual machines, the operations further comprising:
determining a designated configuration for physical machines based on information from the virtual machine and a configuration index; and
routing the virtual machine within the target data center to a physical machine associated with the designated configuration.

5. The apparatus of claim 1, wherein average maximum utilization of physical machines is minimized for the plurality of data centers.

6. The apparatus of claim 1, wherein an average maximum utilization of a resource is minimized for the plurality of data centers, the resource being associated with:
one of processing, memory and disk storage space; and
one of an individual physical machine and a data center resource pool.

7. A computer-readable medium to storing computer program instructions for real-time adaptive placement of a virtual machine, which, when executed on a processor, cause the processor to perform operations comprising:
in response to receiving a virtual machine at a routing component, determining a data center index for the received virtual machine based on lengths of virtual queues associated with respective data centers of a plurality of data centers, wherein the length of a virtual queue associated with a respective data center is based on a class of virtual machines that have been routed to the respective data center;
determining a target data center from the plurality of data centers based on the data center index; and
routing the virtual machine to the target data center.

8. The computer-readable medium of claim 7, further comprising maintaining the virtual queues of one or more virtual machines received at the routing component.

9. The computer-readable medium of claim 8, further comprising:
updating the virtual queues in response to routing the virtual machine to the target data center; and
updating configuration usage fractions associated with the plurality of data centers.

10. The computer-readable medium of claim 7, wherein each of the plurality of data centers include one or more physical machines to host one or more virtual machines, the operations further comprising:
determining a designated configuration for physical machines based on information from the virtual machine and a configuration index; and
routing the virtual machine within the target data center to a physical machine associated with the designated configuration.

11. The computer-readable medium of claim 10, wherein average maximum utilization of physical machines is minimized for the plurality of data centers.

12. The computer-readable medium of claim 10, wherein an average maximum utilization of a resource is minimized for the plurality of data centers, the resource being associated with:
one of processing, memory and disk storage space; and
one of an individual physical machine and a data center resource pool.

13. A method for real-time adaptive placement of a virtual machine, the method comprising:
receiving a virtual machine at a routing component, the routing component having a processor in communication with a memory;
determining a data center index for the received virtual machine based on lengths of virtual queues associated with respective data centers of a plurality of data centers, wherein the length of a virtual queue associated with a respective data center is based on a class of virtual machines that have been routed to the respective data center;
determining, by the processor in communication with the memory, a target data center from the plurality of data centers based on the data center index; and
routing, by the processor in communication with the memory, the virtual machine to the target data center.

14. The method of claim 13, further comprising maintaining the virtual queues of one or more virtual machines received at the routing component.

15. The method of claim 14, further comprising;
updating the virtual queues in response to routing the virtual machine to the target data center; and
updating configuration usage fractions associated with the plurality of data centers.

16. The method of claim 13, wherein each of the plurality of data centers include one or more physical machines to host one or more virtual machines, the method further comprising:
determining a designated configuration for physical machines based on information from the virtual machine and a configuration index; and
routing the virtual machine within the target data center to a physical machine associated with the designated configuration.

17. The method of claim 16, wherein average maximum utilization of physical machines is minimized for the plurality of data centers.

18. The method of claim 16, wherein an average maximum utilization of a resource is minimized for the plurality of data centers, the resource being associated with:
   one of processing, memory and disk storage space; and
   one of an individual physical machine and a data center resource pool.

* * * * *